United States Patent [19]

Norman et al.

[11] Patent Number: 5,133,991
[45] Date of Patent: Jul. 28, 1992

[54] METHOD FOR APPLYING A BIODEGRADABLE PROTEIN FOAM TO A SUBSTRATE

[75] Inventors: Edward C. Norman, Chester Springs, Pa.; Louis R. DiMaio, Wilmington, Del.

[73] Assignee: Chubb National Foam, Inc., Lionville, Pa.

[21] Appl. No.: 584,007

[22] Filed: Sep. 18, 1990

[51] Int. Cl.$^5$ ............................................. B05D 5/00
[52] U.S. Cl. ................................ 427/136; 405/129; 427/244; 427/369; 427/384
[58] Field of Search .............. 427/136, 244, 369, 384; 405/129

[56] References Cited

U.S. PATENT DOCUMENTS

| | | | |
|---|---|---|---|
| 3,790,395 | 2/1974 | Eron | 106/122 |
| 3,850,375 | 11/1974 | Ford | 241/101.7 |
| 4,107,075 | 8/1978 | Kramer | 252/309 |
| 4,421,788 | 12/1983 | Kramer | 427/136 |
| 4,424,133 | 1/1984 | Mulligan | 252/8.05 |
| 4,483,641 | 11/1984 | Stoll | 405/129 |
| 4,487,054 | 12/1984 | Zison | 73/19 |
| 4,519,338 | 5/1985 | Kramer et al. | 118/305 |
| 4,874,641 | 10/1989 | Kittle | 427/244 |

FOREIGN PATENT DOCUMENTS

| | | |
|---|---|---|
| 0206548 | 1/1982 | European Pat. Off. . |
| 0345967 | 7/1982 | European Pat. Off. . |
| 54-000402 | 5/1979 | Japan . |
| 582787 | 6/1983 | U.S.S.R. . |
| 1112881 | 5/1982 | United Kingdom . |
| 1104049 | 8/1982 | United Kingdom . |
| 2073757 | 7/1984 | United Kingdom . |

OTHER PUBLICATIONS

"Waste Age Magazine", Mar. 1987, pp. 83 and 85.
Rusmar Incorporated, "Product Data Sheet"-Long Duration Foam-AC-645 Series, Oct. 1987, pp. 1-6.

*Primary Examiner*—Janyce Bell
*Attorney, Agent, or Firm*—Anna E. Mack

[57] ABSTRACT

A method and apparatus for covering substrates such as landfills, sewage, contaminated soil, sludge deposits, compost piles and the like. A protein based solution, preferably mixed from a foam concentrate, is mixed with air in a foam production nozzle and then spread to an approximately uniform thickness over the surface of the substrate.

In an alternative embodiment the present invention also relates to a method for providing a foam covering to substrates such as buildings and other natural and artificial structures to protect such substrates from adverse environmental conditions such as polluted air or water, insects, extreme hot and cold temperatures and toxic vapors or substances.

15 Claims, 3 Drawing Sheets

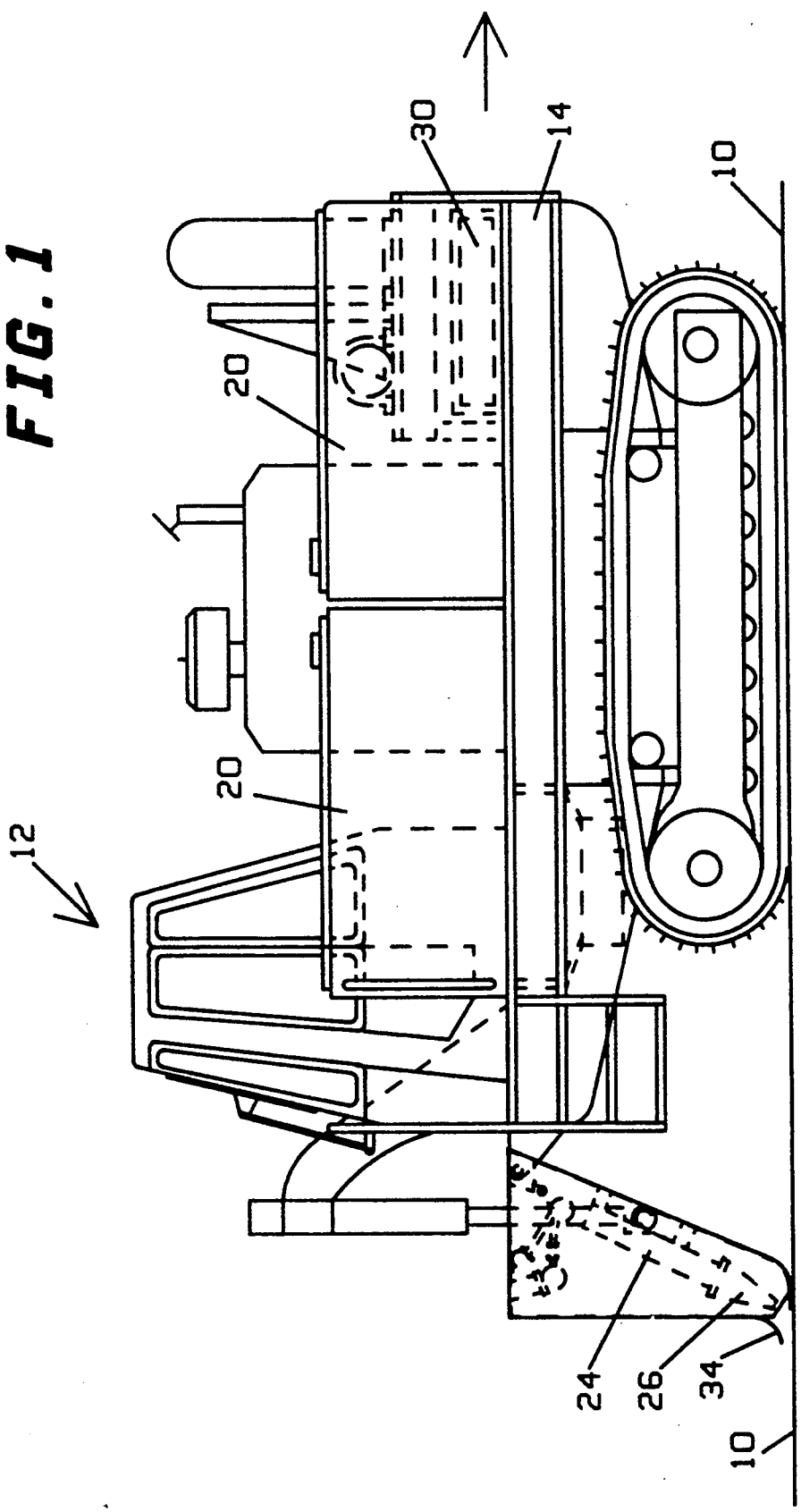

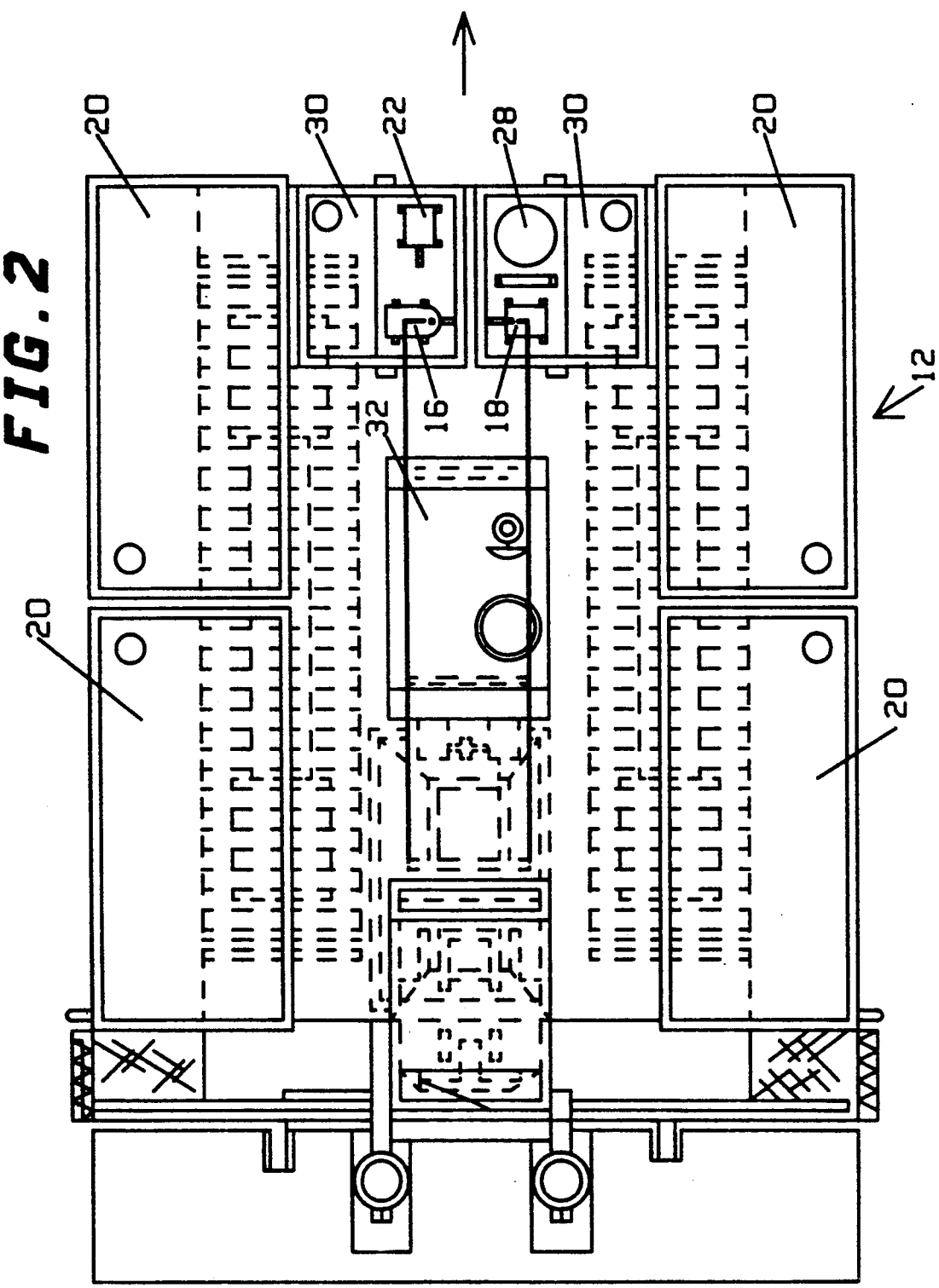

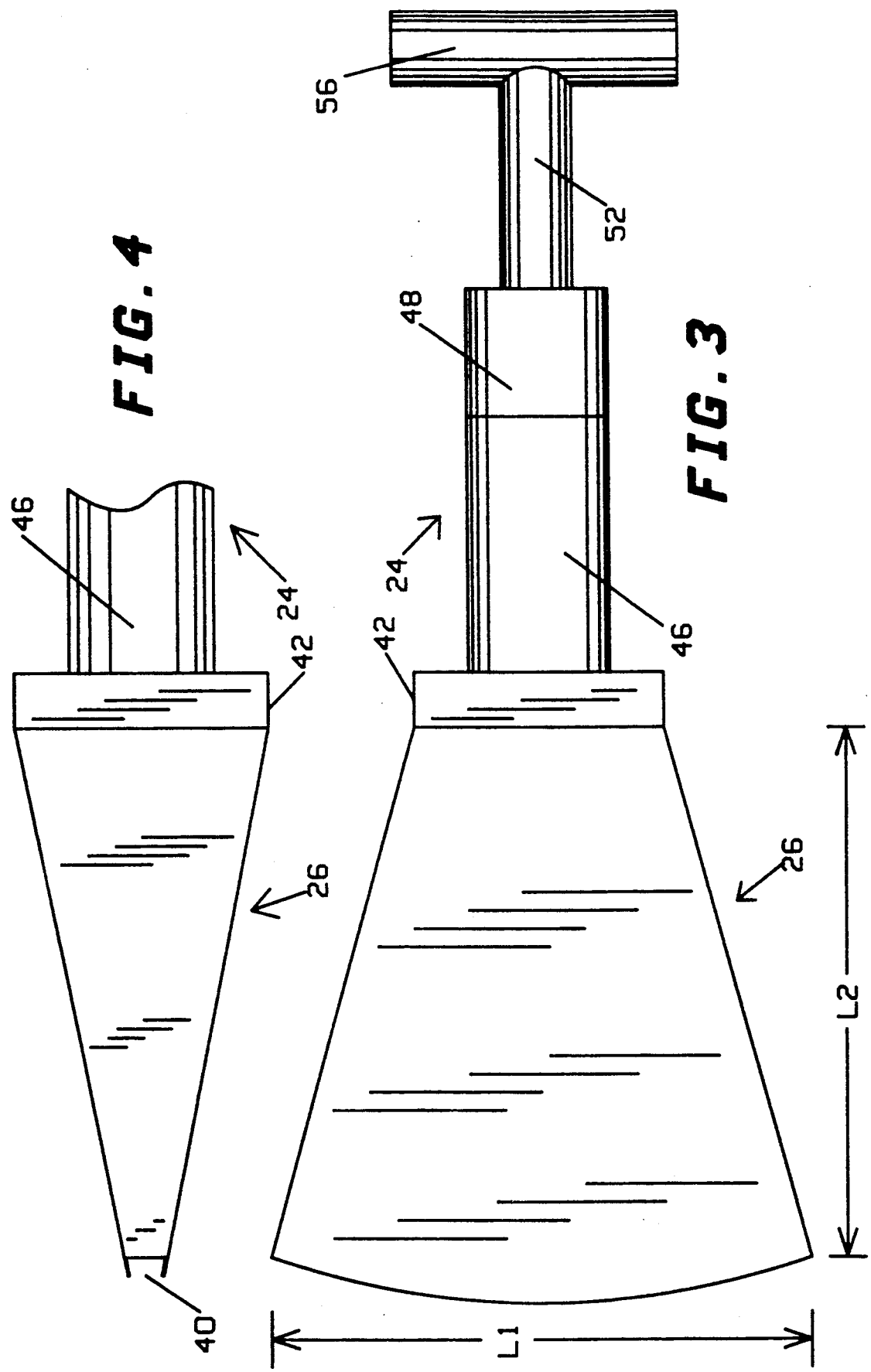

METHOD FOR APPLYING A BIODEGRADABLE PROTEIN FOAM TO A SUBSTRATE

BACKGROUND

1. Field of the Invention

The present invention relates to a method for covering a substrate with an essentially biodegradable protein foam barrier. More particularly, the present invention relates to a method for providing protein containing foam coverings to substrates such as landfills, sewage holding tanks, contaminated soil sites, sludge deposits, compost piles and the like, to effectively form a semipermanent foam layer between the exposed surfaces of such substrates and the environment surrounding them.

In an alternative embodiment the present invention also relates to a method for providing a foam covering to substrates such as buildings and other natural and artificial structures to protect such substrates from adverse environmental conditions such as polluted air or water, insects, extreme hot and cold temperatures, toxic vapors and the like. For example, it is often desirable to provide a protective foam barrier layer on the exposed surfaces of buildings or houses thought to be in the path of forest or brush fires.

In another alternative embodiment the present invention can be used to enhance the action of "oil-eating" bacteria used in the clean-up of petroleum spills by acting as a medium to hold the bacteria in contact with the spilled oil.

Although the method and apparatus described herein may be readily applied to all of the substrates recited above, for simplicity and convenience, this invention will be described in connection with its application as a covering for a landfill waste site. In this application the protein containing foam is used as a substitute for the dirt cover customarily applied to such landfills. It is to be understood, however that the description of this invention as applied to a landfill is merely intended in an illustrative sense and is not to be limited to a single application.

2. Background of the Invention

In the United States, the dumping of waste as in commercial and municipal landfills is regulated by state, local and federal regulations which generally require that the surface of the landfill, containing the day's deposit of waste, must be covered on a daily basis. Typically, such regulations require that the waste on the exposed surface of the landfill (the working face) must be covered by a six inch layer of earth. These regulations are designed to reduce the spread of disease and trash by insects, vermin, birds, etc. by limiting their access to the garbage. Covering the day's refuse also serves to reduce odor and polluting vapors and fumes.

This requirement for covering the day's refuse places a heavy burden on the landfill operators by requiring a substantial amount of labor and equipment to accomplish the daily covering operation. The requirement is also costly to the environment as the available landfill space is rapidly depleted. The addition of six inches of earth daily effectively uses up a great deal of available space within the landfill which could otherwise be used to contain more waste. With available space being rapidly depleted and land prices increasing, this will certainly become an even greater burden in the future.

This problem has been previously addressed in U.S. Pat. Nos. 4,421,788 to Kramer and 4,519,338 to Kramer et al. which disclose use of a hardenable plastic foam in place of the soil. The processes described in these patents claim it is possible to reduce the thickness of the cover to approximately one to two inches or perhaps slightly less while still achieving an adequate cover to provide the protection required. While a reduction in the amount of wasted landfill area and the labor required for application of the covering is reportedly achieved, these patents make no mention of the environmental effects of the hardenable foam itself. For example, these disclosures are silent as to how long it takes for the foam itself to break down, or as to how much valuable landfill space remains occupied by the hardened foam, or the effect the hardened foam has on drainage parameters within the landfill. Although a great improvement in the amount of waste landfill volume has been achieved, further reduction is desirable as well as improvement in the biodegradability of the foam.

Protein based foam has been used for fire fighting and treatment of hazardous material spills in the past. It is known to use xanthan gums as an additive to such foams as for example described in U.S. Pat. No. 4,424,133 to Mulligan. However, the foam described in this patent is not suitable for use as a temporary cover for the substrates described herein because it lacks the long term stability and is less resistant to rain and wind.

The present invention addresses these needs by providing an improved method and apparatus for covering substrates such as landfills using a protein foam. In addition to the foam composition being readily biodegradable, this composition may actually add to the nutrient value of the soil and help promote biodegradation of the landfill waste as well as adding substantial moisture and some aeration. In essence, due to the unique characteristics of the composition described herein, a foam is produced which is capable of working in harmony with nature.

SUMMARY OF THE INVENTION

It is an object of the present invention to provide an improved method for use in covering the surface of a substrate, such as a landfill, sewage holding tank, contaminated soil, hazardous waste or sludge deposit, compost pile and the like.

It is a further object of the present invention to provide an improved method for applying a protective covering to buildings and other artificial and natural structures.

It is a further object of the present invention to provide a protein based foam for use as a covering or barrier which lasts for up to several days before collapsing and ultimately takes up essentially no space.

It is another object of this invention to provide a protein foam cover which is easy to apply such that reductions in labor can be achieved which are similar to those obtained using prior art hardenable foam application methods.

It is still another object of this invention to provide a protein foam cover that is non-polluting and non-film forming and does not leave a permanent residue.

It is still another object of the present invention to provide a protein containing formulation optionally in the form of a concentration which can be mechanically manipulated to produce various dense foam blankets with a life of up to five days or longer with resistance to rain and wind.

These and other objects and advantages of the invention will become apparent to those skilled in the art upon consideration of the following description of the invention.

In one embodiment the present invention provides a method for covering a substrate having one or more surfaces exposed to the environment to provide a temporary or semipermanent foam barrier layer between the substrate and the environment. This method comprises in combination, the steps of providing an aqueous solution or dispersion containing an essentially biodegradable protein base material and one or more foam stabilizing agents; mixing this solution or dispersion with air (as by mechanical manipulation) to produce a foam; and thereafter applying the foam to the exposed surface or surfaces of the substrate to be covered. The foamed surface thus produced may be leveled to produce a substantially uniform layer thickness.

In still another embodiment a method and apparatus are provided for treating landfill waste wherein a protein based solution, preferably diluted from a concentrate using the landfill's own treated leachate, is mixed with air in a foam production nozzle and then spread to an approximately uniform thickness over the surface of the landfill. The foam is spread by an applicator followed by an integral leveler which scrapes the surface of the foam to produce a relatively uniform foam layer approximately four to six inches deep. The protein foam layer can be formulated to last for several days and serves to keep animals out of the refuse and reduces emission of vapors while eliminating the need for a daily cover of earth over the refuse. This provides substantial economic benefits while reducing the wasted volume of the landfill previously occupied by soil to a negligible amount.

The features of the invention believed to be novel are set forth with particularity in the appended claims. The invention itself, however, both as to organization and method of operation, together with further objects and advantages thereof, may be best understood by reference to the following description taken in conjunction with the accompanying drawing/figures.

BRIEF DESCRIPTION OF THE DRAWING

FIG. 1 shows a side view of a foam application apparatus of the present invention.

FIG. 2 shows a top view of the foam application apparatus of FIG. 1.

FIG. 3 shows a top view of a turbulator and nozzle assembly used for foam production.

FIG. 4 show a side view of a portion of the assembly of FIG. 3.

DETAILED DESCRIPTION OF THE INVENTION

All percentages or parts measurements discussed herein are by weight unless stated otherwise.

In the present invention, a protein based foam is used as a cover material for the so called "working face" of a landfill or other surface. The preferred foam is made from concentrated solution derived from a hydrolysed protein concentrate base. Such hydrolysed protein bases are well known in the fire fighting foam art. They are produced by hydrolysing keratin containing materials such as animal hooves and horns, fish scales, hair or feathers. Albumen, bloodmeal, dairy derived proteins or proteins from vegetables such as soy bean meal, etc are other sources of proteinaceous starting materials.

One or more foam stabilizing agents is added to enhance the bubble stability of the foam. Various foam stabilizing agents may be used such as polyvalent metal salts, gums, polysaccharides, soluble starches, starch polymers and deliquescents. Freezing point depressants such as polyglycols or other glycol ethers may be added in small quantities to retard freezing of the concentrate in colder weather but are not necessary. A concentrate of this mixture is added to water at the time of use, or possibly as much as a few hours before, to produce a foam solution.

Unlike the plastic foams which have been used for such applications as insulation, the present foam is not a plastic, gelled or cured foam product. It is derived from natural animal wastes rich in protein. Moreover, it contains no phosphates, mercury or other materials identified as contaminants or pollutants, and is essentially biodegradable.

The proteinaceous materials may be broken down into peptides, polypeptides and salts of amino acids via alkaline hydrolysis with lime or caustic sodium hydroxide (NaOH). The resulting protein hydrolysate is a major component of the foam concentrate. Other methods for producing the protein hydrolysate may equally well be used.

Because the naturally derived protein base has been shown to be non-toxic, non-polluting and completely biodegradable, it is believed to be a superior covering material for landfills. Because of these attributes, the use of such foam is perceived to be more biologically compatible with nature, thus overcoming the otherwise environmentally objectionable aspects normally associated with landfills, municipal waste and land reclamation projects in general.

The basic composition of the protein foam concentrate of the preferred embodiment is shown in Table 1 below:

TABLE 1

| COMPONENT | APPROX. PERCENTAGE |
|---|---|
| protein hydrolysate (concentrate) | 35–70 |
| polyvalent metallic salt | 1.0–2.5 |
| foam booster | 3–7 |
| bactericide | 0.1–0.2 |
| dispersant | 10–14 |
| water | balance | with all percentages being by weight unless otherwise stated.

A more preferred formulation of the foam concentrate is shown in Table 2 below:

TABLE

| COMPONENT | PERCENTAGE |
|---|---|
| protein hydrolysate (concentrate) | 35–70 |
| iron salt (Ferrous Chloride) | 1.0–2.5 |
| foam booster | 3–7 |
| bactericide | 0.1–0.2 |
| sodium lignosulfonate | 10–14 |
| water | balance |

A still more preferred composition of the foam concentrate is shown in Table 3 below:

TABLE 3

| COMPONENT | PERCENTAGE |
|---|---|
| protein hydrolysate (concentrate) | 61.70 |

TABLE 3-continued

| COMPONENT | PERCENTAGE |
| --- | --- |
| iron salt (Ferrous Chloride) | 1.80 |
| hexylene glycol | 3.24 |
| Nipacide BCP | 0.18 |
| sodium lignosulfonate (Marasperse N-22) | 12.98 |
| water | 17.80 |

The protein hydrolysate is commercially available as a 35–50% concentrate having a pH from approximately 7 to 8 and a specific gravity of 1.148 to 1.152. It can be obtained from any of a number of manufacturers of protein based fire fighting foam or it may be hydrolyzed, as previously described, from the protein found in animal hooves, horns, etc. The concentrate can be made, for example, by lime hydrolysis.

A polyvalent metal salt is added preferably to provide a level of foam stabilization by bonding the reactive sites on the protein residue, gums or other polyelectrolytes in the formula. Ferrous chloride is the agent of choice as it is relatively inexpensive and is not considered to be environmentally hazardous.

Desirably any number of known freezing point depressants may be added to the basic formulation if needed. In particular, polyalcohols, polyglycol ethers, glycols, etc. Reference to freezing point depressants is only for protection of the concentrate. Hexylene glycol is preferred and is added primarily as a foam booster, although it also serves as a freezing point depressant. Other foam boosters suitable for use include diethylene glycol, dipropylene glycol and glycol ethers such as 2-ethoxyethanol, 2-butoxyethanol and 2-(butoxyethoxy) ethanol.

Preferably, a bactericide is added as a preservative to prevent the decomposition of the foam concentrate by bacteria. Any number of bactericides may be used such as Kathon, available from Rohm & Haas Co., Nipacide BCP or Nipacide MX available from Nipa Laboratories, and the proportions adjusted according to need. The proportion recited in Table 3 is suitable when the bactericide used is Nipacide BCP. Because protein hydrolysates are excellent nutrient sources for microbiological life forms, a low level toxicity biocide should be added to preserve the concentrate. However, when the concentrate is diluted for use, the concentration of the biocide becomes so small that it can no longer provide the preservative effect. Thus, long term holding of premixed solution is not advised.

Many commercially available dispersants may also optionally be added to enhance the dispersion of ingredients and to provide additional foamability and foam stability. Sodium lignosulfonate sold as Marasperse N-22, available from Daishowa Chemicals is preferred, but other dispersants such as lignosulfonate and alkyl naphthalene sulfonates may also be used.

The basic foam concentrate formula is diluted to approximately 2.0 to 3.5% with water prior to turbulation to produce foam. The preferred dilution is approximately 3% but a relatively wide range is functional. At 3% (i.e. 97 parts by volume of water), dilution, the solution produces a high quality foam which is highly cost effective.

To the above basic formula, an additional foam stabilizer may optionally be added to improve the resistance to rain and/or wind and to improve the long term (measured in days) stability of the foam blanket when applied. A number of materials can be used for this purpose. For example, the addition of a polysaccharide xanthan gum commercially available under the trade name Rhodopol 23, manufactured by Rhone-Poulene, can increase the foam stability and minimize surface erosion of an aging foam blanket by wind. The basic formulation of the foam with the addition of a 0.08% portion by weight of xanthan gum may result in an increase in the life of the foam blanket from approximately 48 hours to beyond 72 hours. Suitable ranges of xanthan gum are from roughly 0.03 to 0.1% by weight depending upon the stability of the foam desired. Optimum, foam stability appears to occur with the addition of approximately 0.05 to 0.1% xanthan gum.

With certain xanthan gums, there is a possibility that the solution will gel if the gum is added and allowed to set for too long. Therefore, it is preferable to add the xanthan gum to the mixture just prior to use.

In place of the xanthan gum, other known humectant gums, thickening agents and foam stabilizers may be used. Examples of potential candidates are such water soluble polymers as Macol 108 POE/POP block copolymer, Peg 600 Polyoxyethylene Monolaurate and Tetronic 904 POE/POP block copolymer. Optionally, foam stabilizers such as polyacrylamide, polyacrylamide/vinyl acetate - methyl pyrrolidone copolymer, polyvinyl alcohol and water soluble cellulose and derivatives thereof may be added directly to the concentrate. Suitable concentrations in the range of about 1% to 20% are desirable when these agents are added to the concentrate. After dilution, they will be present in the solution in the range of about 0.1% to 2%.

In field tests, a three percent solution of foam applied to a thickness of six inches lasts approximately one to three days without a foam stabilizer. By adding 0.08% xanthan gum, the foam lasted five to seven days under similar environmental conditions. The stabilized foam produced a thick stable cover capable of supporting substantial weight. Wind and rain resistance properties were also improved.

In a preferred embodiment of the present invention, the water used to mix with the concentrate to produce a dilute solution is actually a potable water. The treated leachate of the landfill singly or mixed with potable water may be suitable. Many modern landfills have a sealed bottom to prevent waste from passing into the groundwater below thus causing pollution. In such an arrangement, it is common to drain off the liquids (the leachate) obtained from the landfill, including substances washed down by rain water and the like, into a holding reservoir where the leachate is treated. The most common form of treatment is simply to aerate the leachate. In other landfills, more elaborate purification of the leachate is performed. Although in some circumstances the leachate may contain materials which will impair or perhaps even totally inhibit the performance of the foam, this can be determined experimentally to determine the extent to which such leachate can be used.

By using the leachate reservoir as a source of the water for dilution of the concentrate, several advantages are achieved. The leachate will likely contain numerous microorganisms of whichever strains tend to thrive in the environment of the particular landfill at hand. By using this leachate and reintroducing the microorganisms suspended in the foam blanket, it is believed that enhanced decomposition of the waste material will be achieved. In addition, the natural selection process which determines which strains of microorganisms thrive in a particular landfill environment will provide a tailor made culture which is more likely to survive in the landfill to do its job. While, presumably, such microorganisms could be introduced into the foam compositions artificially, there is a lower probability that they could survive unless they were properly selected for the particular environment.

Further advantages lie in the use of a supply of water which is not otherwise generally useful thus conserving the supply of fresh water and recycling the leachate. This additionally serves to reduce the cost of supplying the water to dilute the concentrate and recycles the water to the landfill for further natural biological cleansing. In some instances, the leachate will likely degrade performance of the foam blanket. This can be combatted in many instances by either adding foam stabilizers, diluting the leachate with fresh water, increasing the concentration of foam concentrate, or some combination of the above.

The effects of the variation of the ingredients and application methods can be better appreciated upon review of the following examples. Examples 1 to 6 were conducted at an actual operational landfill under similar weather conditions.

EXAMPLE 1

Five gallons of foam concentrate were added to 160 gallons of water to produce a 3% solution by volume for application to a landfill. The solution was mixed by recirculation for approximately five minutes and then turbulated to produce foam using a pump pressure of 125–140 psi for the liquid injection and 90 psi for the air. At the foam production turbulator - nozzle, equal pressures of 75–90 psi for both air and liquid were maintained. The nozzle was packed with small ½" plastic spheres and ⅜" Raschig rings and stainless steel shavings and delivery of the foam was through a duck-bill shaped spreader. The foam exited the nozzle as a broad ribbon-like band that was easily applied and folded. Foam depth depended upon the foam velocity from the nozzle and the speed that the nozzle is moved. Most deposition was approximately 6 inches thick. The foam appeared creamy as shaving cream and the useful life of the foam blanket was approximately 48 hours.

EXAMPLE 2

Five gallons of foam concentrate were mixed with 140 gallons of potable water and 20 gallons of 0.5% xanthan gum to produce a 3% solution with 0.0625% gum stabilizer. The mixture was thoroughly mixed by recirculation and applied under the same conditions as example 1. The foam appeared similar to that of example 1. After 48 hours, the surface had darkened in color but had not yet eroded significantly. The foam was less friable at the surface. Five days later (120 hours) a significant foam blanket was still in place with a depth of approximately 4 inches. The foam was still moist and the surface intact. Thus, the addition of the xanthan gum as a stabilizer at least doubled the life of the foam blanket in this test.

EXAMPLE 3

In this example, the landfill leachate reservoir was used as a source of 160 gallons of treated (by aeration) leachate (water). This was mixed with 5 gallons of foam concentrate, recirculated to mix and applied as in example 1. The appearance of the foam initially appeared normal, but within 3 to 4 hours of application, run off drainage solution was noted. This did not occur with example 1 or 2. 24 hours later the foam blanket had shrunk and the residue was dry and powdery and easily collapsed in the wind. This solution may be acceptable where short foam life can be tolerated such as for an overnight blanket. Additional life may be possible with addition of foam stabilizers. Different results can be expected depending on the composition of the leachate.

EXAMPLE 4

Four gallons of foam concentrate were added to 150 gallons of potable water and 5 gallons of Chubb National Foam Universal Foam Concentrate (a concentrate used as a fire fighting foam and for hazardous material spill applications) to produce a 6.25% solution. The solution was mixed and applied to a landfill as in example 1. The resulting foam blanket had a creamy texture but was more elastic in movement and seemed to set more slowly. The foam tended to flow laterally to self level and exhibited normal expansion. Drain off was evident in 3–4 hours by edge wetting. After 24 hours, the surface was dry and powdery on the surface with a moist interior. Wind erosion was noted, but this formulation is adequate for a 24 hour blanket.

EXAMPLE 5

A 6.25% solution was prepared using 75 gallons of potable water with 2.5 gallons of concentrate and 2.5 gallons of Chubb National Foam Aer-O-Foam XL-3 (a fluoroprotein fire fighting foam concentrate). The mixture was mixed and applied as in example 1. This formulation provides an excellent 24 hour blanket.

EXAMPLE 6

A 6% solution was prepared using 155 gallons of potable water and 10 gallons of Chubb National Foam Aer-O-Foam XL-3. The mixture was mixed and applied as in example 1 and provided a blanket with an appearance similar to that of example 1 but which set more quickly and was stiffer (in part because of the higher concentration). The blanket lasted for about 24 hours, but at that point the top surface was dry and drainage was noted. Rain simulated by gentle fog spray of water collapsed the 24 hour blanket.

EXAMPLE 7

The composition of Table 3 is diluted with water to a concentration of 3% and foamed by use of a CAFS (compressed air foaming system) machine such as those in common use in wildland fire fighting. These machines deliver the foam through a hose with sufficient velocity that the foam may be projected as far as 100 ft. The foam so generated is of a stiff consistency and adheres to vertical surfaces. Thus it is used to cover walls and roofs of buildings and other structures to protect them against ignition from the radiant heat and firebrands generated by the passage of the fire front of forest or brush fires. This protection lasts for up to 48 hours. Similarly, such foam is used to coat vegetation for the establishment of "wet lines" to prevent the spread of forest or brush fires.

EXAMPLE 8

Foam generated in the manner described in example 7 is also used to coat the working face and excavated contaminated soil in hazardous waste site clean-ups to prevent the release of hazardous and nuisance vapors.

Optionally, the working face may be coated in the manner described in examples 1 and 2. The working life of the foam cover is 24–48 hours. This life is extended by the addition of previously described foam stabilizers to the foam solution. Prior to transportation of the contaminated soil by truck or rail car, the surface of the soil is coated with 6–8 inches of foam to prevent the release of vapors enroute.

EXAMPLE 9

The foam of examples 1, 2, or 7 is applied to windrows of contaminated soil excavated from hazardous waste cleanups where the soil is undergoing bioremediation. The foam prevents the release of vapors and odors, maintains an effective moisture content in the windrows and supplies a nutrient broth to the bacteria as it breaks down.

EXAMPLE 10

Bacterial cultures of the type which are used to break down spilled crude oil or other forms of petroleum are mixed with a 3% solution of the composition of Table 3 in either fresh or sea water. The resultant solution is foamed by the method described in example 7 and projected on to the surface of the spill. The foam acts as a broadcasting medium to aid in even distribution of the bacteria and enhances the effectiveness of the bacteria by holding them in intimate contact with the spilled petroleum. The protein content of the foam also serves as a source of nutrients to the bacteria.

The above examples demonstrate that by blending the basic formula and/or other protein foam concentrates it is possible to engineer a foam with varying properties such as service life, cost, etc. Further, the actual mechanical manipulation of the foam solution and air to produce the foam blanket can have substantial impact on the life of the blanket. For example, if the foam is turbulated and applied directly to the surface without being sprayed over substantial distances, the foam tends to last significantly longer due to the energy being expended to propel the foam being better utilized to better mix the foam solution with air. Also the propelling of the foam may actually weaken the blanket in some manner.

The process may be carried out using a pre-mix batch, applied by any conventional compressed air foaming system or by a turbulator foam generator nozzle. However, systems using precise proportioning techniques may also be used to balance the foam concentrate with the dilutant. By using proportioning techniques, there is no left over premix to dispose of and thus these techniques are generally preferable.

The performance of the system is based on composition(s) of the foam concentrate(s) and the mechanical manipulation of the foam solution. Ideally, the foam solution conversion which optimizes air (or gas) entrained and minimizes unconverted solution or interstitial liquid gives best results. Under these conditions, wet densities should range from approximately 3 to 5.2 lbs / cubic foot with expansions of from 20 to 1 through 12 to 1 respectively. For example, a foam blanket 6 inches in thickness has a wet density of 1.5 lbs to 2.6 lbs / square foot depending on expansion.

Foam stability is a direct function of bubble size and consistency of bubble size. A homogeneous foam that would allow formation of polyhedrons having flat faces in the shape of a pentagon, such as dodecahedron would be ideal. In practice, using the production method to be described, nearly uniform bubble texture is observed. Bubble sizes of 0.050 to 0.25 inches but in any case less than about 0.5 inches in diameter appear to give the most acceptable blanket performance. Consistency in bubble size is more important than actual size, but for the solutions of the present invention, smaller bubble sizes are generally better. Unlike insulating foams and the like where dry densities yield light cellular structures, the wet density of landfill foams, hence small bubble sizes, is more desirable because it adds mass to hold down debris and resist surface erosion by moderate winds and holds water.

Turning now to the drawing in which like reference numerals designate corresponding parts throughout the several figures thereof, and in particular to FIG. 1 in conjunction with FIG. 2, a vehicle mounted proportioning apparatus used for application of the foam cover of the present invention is shown. In this embodiment, the foam spreading device is mounted to a bulldozer or similar land vehicle such as a Caterpillar 40" triple grouser track loader undercarriage or other low profile wide tread vehicle for traveling over the compressed surface of the landfill (working face) 10. Such a vehicle is shown as 12 in the figures. In some embodiments of the present invention, as in this figure, the vehicle may be a special purpose vehicle used primarily for application of the foam. In other embodiments, the foam production equipment may be temporarily mounted in the bucket of a bulldozer or similar machine or may be towed behind the vehicle. The forward direction of movement of the vehicle is shown by the arrow in FIG. 1 and FIG. 2.

The bed 14 of the vehicle 12 carries an air compressor 16 (or possibly a tank of compressed air) driven by a motor 18 to provide air for mixing with the foam solution. The water or leachate is carried in a plurality of tanks 20. Solution is made from the above foam concentrate and water in a proportioner. Total tank capacities of approximately 1000 to 3000 gallons are generally satisfactory.

A water pump 22, preferably a positive displacement water pump, pumps the water from the tanks 20 into a proportioner and then to a manifold feeding a plurality of turbulators 24 and foam production nozzles 26 mounted at the rear of vehicle 12. The water pump 22 may be driven by an independent power source such as an electric generator or may tap into the power train of the vehicle to operate the pump. An oil recovery unit 28 is used to recover oil from the air compressor in a known manner. A pair of tanks 30 to carry foam concentrate are mounted to either side of the compressor 16 and motor 18. The vehicle's engine 32 and associated hardware is positioned at a central area of the vehicle 12.

The water or leachate and foam concentrate may be mixed in a known manner using known proportioning techniques such as those used in proportioning foam generation equipment used for fire fighting to produce the proper percentage solution. Stabilizer can be added to the water or leachate, or if the stabilizer does not cause long term storage problems, it can be added or provided in the concentrate. The solution is then supplied to a manifold connecting a plurality of turbulator—nozzle assemblies. In the embodiment shown, seven such turbulator—nozzle assemblies are connected together on 20 inch centers to provide a path of foam approximately 12 feet wide. When the foam is dispensed from the spreader portion 26 of the nozzle, it is wiped to a consistent height by a plastic (or metal or other suitable material) screed 34.

The turbulator—nozzle assembly of a preferred embodiment is shown in FIG. 3 and FIG. 4. This assembly is made of ⅜" thick standard metal or steel tubing which is shaped and welded into the configuration shown. The spreader 26 is approximately 15 inches in dimensions L1 and L2 and tapers to an opening 40 of about 1⅜" at the tip. The top 42 of the spreader is approximately 6" square. Top portion 42 is mated to the turbulator 24 portion of the turbulator-nozzle assembly which is made of three series connected sections.

The bottom-most section 46 is a Raschig ring packed turbulator made of a pipe of approximately 4" diameter which is packed with ⅜" OD×3/16" ID×⅜" long plastic (polypropylene) Raschig rings. At both ends of the Raschig ring turbulator 46 is a screen with mesh small enough to contain the Raschig rings. This turbulator is approximately 12 inches in length.

The middle section 48 is a sphere packed turbulator which is approximately 6 inches in length. This section is similarly made of pipe of approximately 4 inch diameter which is packed with ½" or ⅜" polypropylene spheres. Once again, screens are used to contain the spheres of the turbulator.

The uppermost section 52 forms a turbulator and is made of narrower diameter pipe having a one inch inner diameter and approximately 6 inches length. This section 52 is loosely packed with stainless steel turnings such as those used for scouring pads (e.g. Chore-Boy TM brand scouring pads).

The upper end of the packed turbulator 52 is attached to a mixing chamber 56. Air and foam solution are injected into this mixing chamber 56 through internal orifices (not shown). The solution pressure at this point is approximately 80-95 psi with a feed rate of 12-16 gallons of solution per minute per nozzle. Air is injected at approximately 80-95 psi at this point to provide an expansion of approximately 12-16 times.

In operation, the foam solution and air mixture are delivered to the turbulator - nozzle assembly where three stages of turbulation take place. First in the steel turnings packed turbulator 52, second in the sphere packed turbulator 48 and finally in the Raschig ring turbulator 46. Finally, the foam is delivered to the duck bill shaped spreader 26 where it comes out and is spread over the landfill. The thickness of the blanket can be controlled by the speed of the vehicle, the height and rigidity of the screed 34 and the delivery rate of the foam.

To obtain a six inch thick blanket for landfill application, the solution is applied at a rate of approximately 300 to 500 square feet per 100 gallons of 3% solution for a covering of approximately six inches in depth. The trash should preferably be compacted prior to application of the foam in order to more easily cover the surface. This is generally no problem since the surface of the landfill is more or less constantly being worked as new trash is added to maximize use of the landfill. If a premix process is used, just prior to application of the foam, the solution is mixed from a concentrate with an appropriate amount of water to form a solution of approximately 3% by volume (that is 3 parts of the concentrate is diluted with 97 parts of water by volume to produce a 3% solution. The stabilizer is added and this solution is mixed and then applied as described above. The protein foam remains soft and foamy for some time after application which allows for some settling into cracks and crevices which form in the surface of the working face. When more refuse is to be added, it is simply placed on top of the layer of protein foam which essentially completely collapses under the weight of the refuse and the equipment used to manipulate the refuse. The foam blanket therefore ultimately occupies essentially no space within the landfill.

The mechanical manipulation of the foam mass as described is accomplished by metering compressed air (or other gas) to a mixing point where metered foam solution is likewise directed. Sizing the orifices of the applicator 28, or using valves, to maintain and balance the operating pressures provides optimum air-solution mixture.

The foam coating produced by this process is readily degradable and may actually improve the degradation of other materials in the landfill. The foam can be formulated to remain soft throughout its useful life and therefor provides little in the way of a physical barrier to wildlife, but nonetheless seems to provide enough of a barrier to effectively thwart birds and other wildlife. The foam is relatively harmless to wildlife if ingested or breathed in small quantities and birds appear to be repelled somewhat by it.

Thus it is apparent that in accordance with the present invention, an improved apparatus and method that fully satisfies the objectives, aims and advantages is set forth above. While the invention has been described in conjunction with specific embodiments, it is evident that many alternatives, variations, modifications and permutations will become apparent to those skilled in the art in light of the foregoing description. Accordingly, it is intended that the present invention embrace all such alternatives, variations, modifications and permutations as fall within the spirit and broad scope of the appended claims.

What is claimed as new and desired to be secured by Letters Patent is:

1. A method for covering a substrate selected from the group consisting of landfills, hazardous wastes, soil contaminated with hazardous wastes or vapors, sludge, sewage and compost piles, having one or more surfaces exposed to the environment, to provide a semipermanent, essentially biodegradable, barrier layer between said substrate and the environment, comprising the following steps in combination:

provided an aqueous solution or dispersion mixed from a concentrate consisting essentially of the following ingredients with the approximate percentages given by weight: protein hydrolysate (concentrate) 35-70%, polyvalent metallic salt 1-2.5%, foam booster 3-7%., bactericide 0.1-0.2%, dispersant 10-14% and the balance water;

mixing said solution or dispersion with one or more foam stabilizing agents;

mixing the resulting solution or dispersion with air to produce a foam; and applying said foam to the exposed surface or surfaces of said substrate.

2. The method of claim 1 wherein the foam stabilizing agent is xanthan gum.

3. The method of claim 2 wherein the xanthan gum is present in an amount between about 0.03 and 0.10% by weight of said solution or dispersion.

4. The method of claim 3 further comprising the step of leveling the foam layer to produce a substantially uniform covering.

5. The method of claim 3 wherein the polyvalent metallic salt is ferrous chloride.

6. The method of claim 3 wherein the foam booster is hexylene glycol.

7. The method of claim 3 wherein the dispersant is sodium lignosulfonate.

8. A method for covering the working face of a landfill or other storage facility for refuse optionally having a leachate reservoir, to provide an essentially biodegradable barrier layer between said working face and the environment comprising the following steps in combination:

provinding an aqueous solution or dispersion mixed from a concentrate consisting essentially of the following ingredients with the approximate percentages given by weight: protein hydrolysate (concentrate) 35-70%, polyvalent metallic salt 1-2.5%, foam booster 3-7%, bactericide 0.1-0.2%, dispersant 10-14% and the balance water;

mixing said solution or dispersion with one or more foam stabilizing agents;

mixing the resulting solution or dispersion with air to produce a foam; and applying said foam to said working face to a depth adequate to cover the refuse on said working face.

9. The method of claim 8 wherein the foam stabilizing agent is xanthan gum.

10. The method of claim 9 wherein the xanthan gum is present in an amount between about 0.03 and 0.10% by weight of said solution or dispersion.

11. The method of claim 10 wherein said solution or dispersion is prepared by diluting the concentrate with leachate obtained from the leachate reservoir.

12. The method of claim 10 wherein the polyvalent metallic salt is ferrous chloride.

13. The method of claim 10 wherein the foam booster is hexylene glycol.

14. The method of claim 10 wherein the dispersant is sodium lignosulfonate.

15. The method of claim 10 further comprising the step of leveling the upper surface of said foam to produce a substantially uniform surface over said working face.

* * * * *